United States Patent
Hou et al.

(10) Patent No.: US 9,335,499 B2
(45) Date of Patent: May 10, 2016

(54) OPTICAL MODULE

(71) Applicant: FOXCONN INTERCONNECT TECHNOLOGY LIMITED, Grand Cayman (KY)

(72) Inventors: Li-Shing Hou, New Taipei (TW); Jerry Wu, Irvine, CA (US); Shuai-Hui Huang, Kunshan (CN); Ru-Yang Guo, Kunshan (CN); Hai-Li Wang, Kunshan (CN)

(73) Assignee: FOXCONN INTERCONNECT TECHNOLOGY LIMITED, Grand Cayman (KY)

( * ) Notice: Subject to any disclaimer, the term of this patent is extended or adjusted under 35 U.S.C. 154(b) by 0 days.

(21) Appl. No.: 14/841,961

(22) Filed: Sep. 1, 2015

(65) Prior Publication Data

US 2016/0062044 A1   Mar. 3, 2016

(30) Foreign Application Priority Data

Sep. 1, 2014  (CN) .......................... 2014 1 0439391

(51) Int. Cl.
*G02B 6/32* (2006.01)
*G02B 6/36* (2006.01)
*G02B 6/42* (2006.01)

(52) U.S. Cl.
CPC .............. *G02B 6/4292* (2013.01); *G02B 6/322* (2013.01); *G02B 6/3608* (2013.01); *G02B 6/3652* (2013.01); *G02B 6/4204* (2013.01); *G02B 6/4246* (2013.01); *G02B 6/4249* (2013.01)

(58) Field of Classification Search
CPC .... G02B 6/322; G02B 6/3608; G02B 6/3652; G02B 6/42; G02B 6/4201; G02B 6/4204; G02B 6/4246; G02B 6/49; G02B 6/4292
USPC ............... 385/32–33, 53, 76–78, 88–94, 135
See application file for complete search history.

(56) References Cited

U.S. PATENT DOCUMENTS

| | | | |
|---|---|---|---|
| 5,781,682 A | 7/1998 | Cohen et al. | |
| 6,386,768 B1 | 5/2002 | Yoon et al. | |
| 7,329,151 B2 | 2/2008 | Wu | |
| 8,297,856 B2 * | 10/2012 | Banal, Jr. ............. | G02B 6/4292 385/135 |
| 2011/0268390 A1 | 11/2011 | Yi et al. | |
| 2014/0161398 A1 | 6/2014 | Yi | |

\* cited by examiner

*Primary Examiner* — Akm Enayet Ullah
*Assistant Examiner* — Michael Mooney
(74) *Attorney, Agent, or Firm* — Ming Chieh Chang; Wei Te Chung

(57) ABSTRACT

An optical module includes a horizontal base plate, a lens mounted on the base plate, a fiber sleeve, and a board lock. The lens has a front end face and a rear end face corresponding to the front end face. The fiber sleeve is mated with the rear end face of the lens. The fiber sleeve has a front surface and a rear surface. The board lock is mounted at a rear of the fiber sleeve. The board lock has a strain relief base and a cover locking to the strain relief base. The strain relief base has a front wall and a pogo pin forwardly extending beyond the front wall. The fiber sleeve defines a receiving hole in the rear surface for fixing the pogo pin. The cover is retained to the base plate.

20 Claims, 5 Drawing Sheets

OPTICAL MODULE

BACKGROUND OF THE INVENTION

1. Field of the Invention

The present invention relates to an optical module, especially to a mounting structure between components thereof.

2. Description of Related Arts

U.S. Patent Application Publication No. 2014/0161398, published on Jun. 12, 2014, discloses an optical module comprising a printed circuit board, an optical lens mounted on the printed circuit board, and a fiber submount mated with the optical lens. The fiber submount comprises a pair of latch beams extending forwardly, and the lens comprises a pair of latch notches latched with the latch beams, respectively. Such mating structure is complex and difficult to disassemble.

An improved optical module is desired.

SUMMARY OF THE INVENTION

An object of the present invention is to provide a optical module including an improved mounting structure between the components of the optical module.

To achieve the above-mentioned object, an optical module comprising: a horizontal base plate; a lens mounted on the base plate, the lens having a front end face and a rear end face corresponding to the front end face; a fiber sleeve mated with the rear end face of the lens, the fiber sleeve having a front surface and a rear surface; and a board lock mounted at a rear of the fiber sleeve; wherein the board lock has a strain relief base and a cover locking to the strain relief base, the strain relief base has a front wall and a pogo pin forwardly extending beyond the front wall, the fiber sleeve defines a receiving hole in the rear surface for fixing the pogo pin, the cover is retained to the base plate.

Other objects, advantages and novel features of the invention will become more apparent from the following detailed description when taken in conjunction with the accompanying drawings.

DETAILED DESCRIPTION OF THE PREFERRED EMBODIMENT

Reference will now be made in detail to the preferred embodiment of the present invention.

Figure 1:
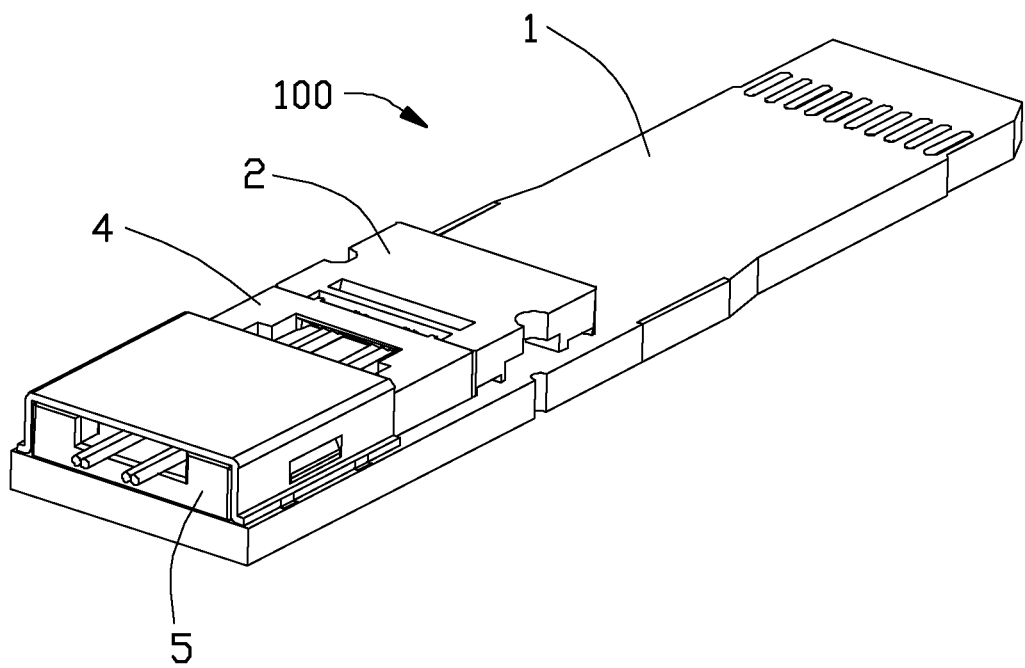
FIG. 1 is a perspective view of an optical module according to the present invention.
Figure 2:
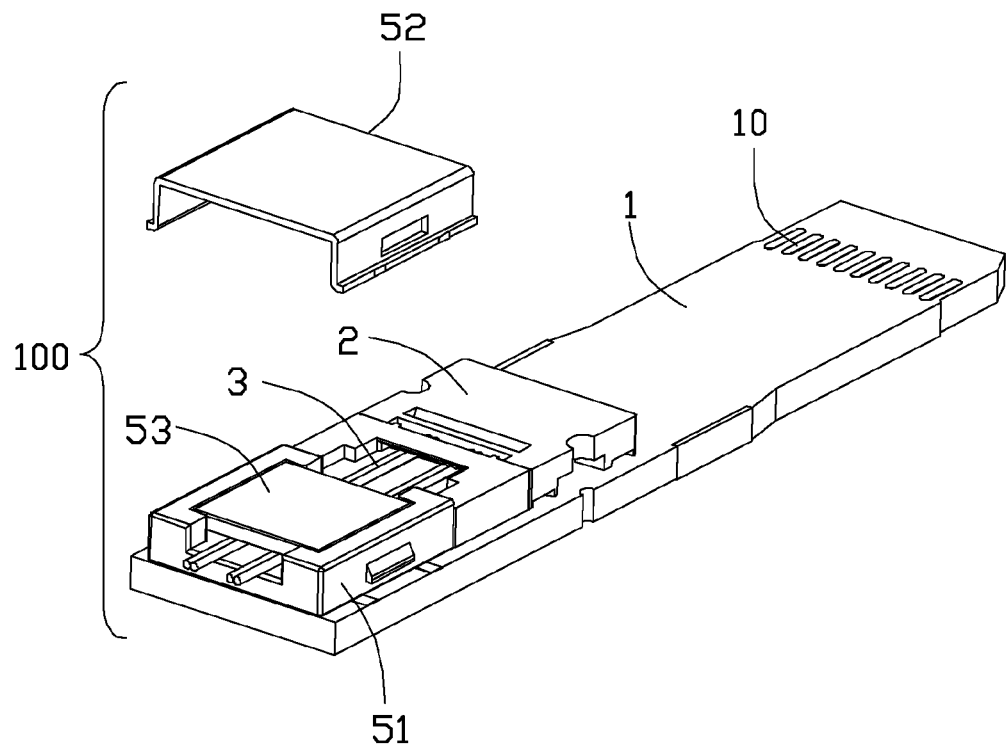
FIG. 2 is a partly exploded view of the optical module.

Referring to FIGS. 1-2, an optical module 100 includes a horizontal base plate or printed circuit board 1, a lens 2 mounted on the base plate 1, a plurality of fibers 3, a fiber sleeve or fiber holder 4 receiving the fibers 3, and a board lock or strain relief assembly 5 mounted at a rear of the fiber sleeve 4.

Figure 3:
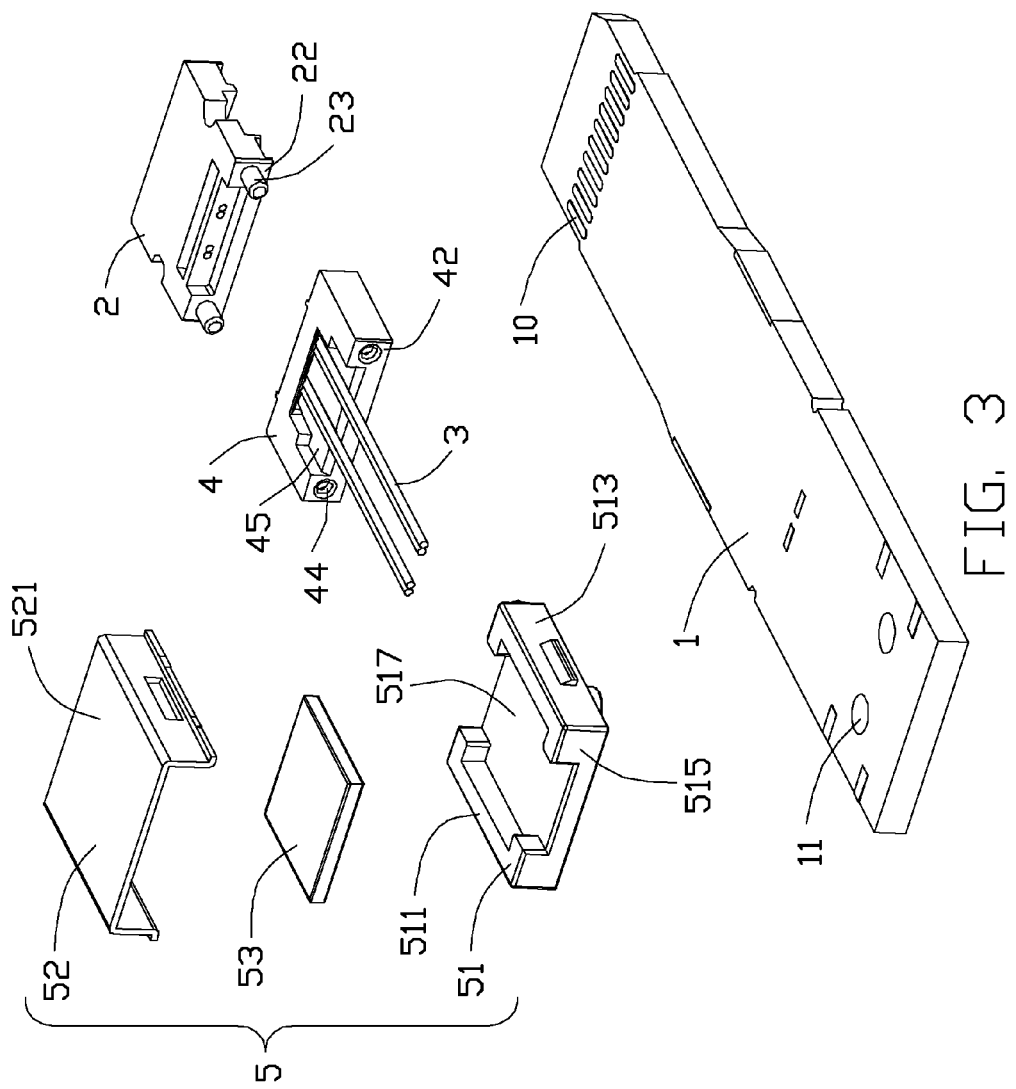
FIG. 3 is a fully exploded view of the optical module.

Referring to FIG. 3, the base plate 1 has a number of pads 10 on the front end of the base plate 1. The base plate 1 further defines a pair of mounting holes 11 through the base plate 1 in the rear end of the base plate 1.

Figure 4:
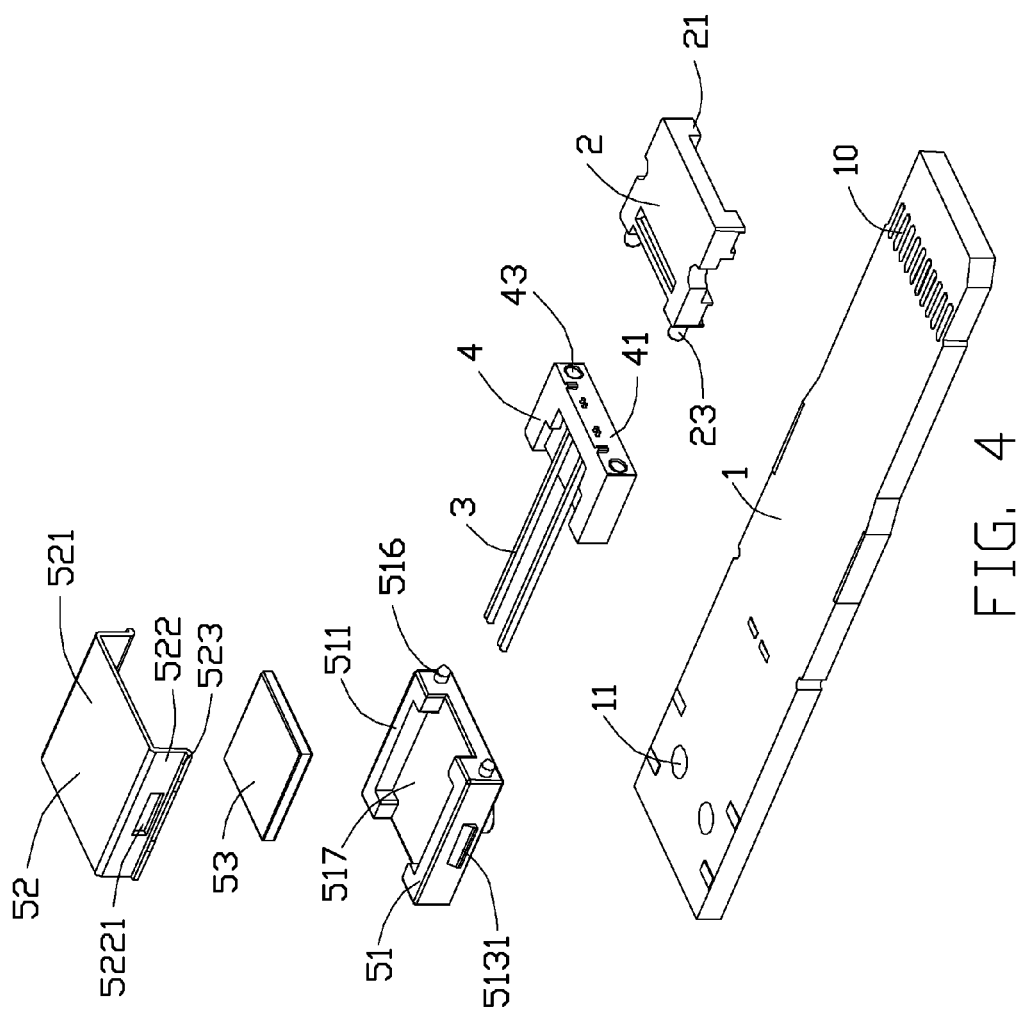
FIG. 4 is a view similar to FIG. 3 but from another perspective.
Figure 5:
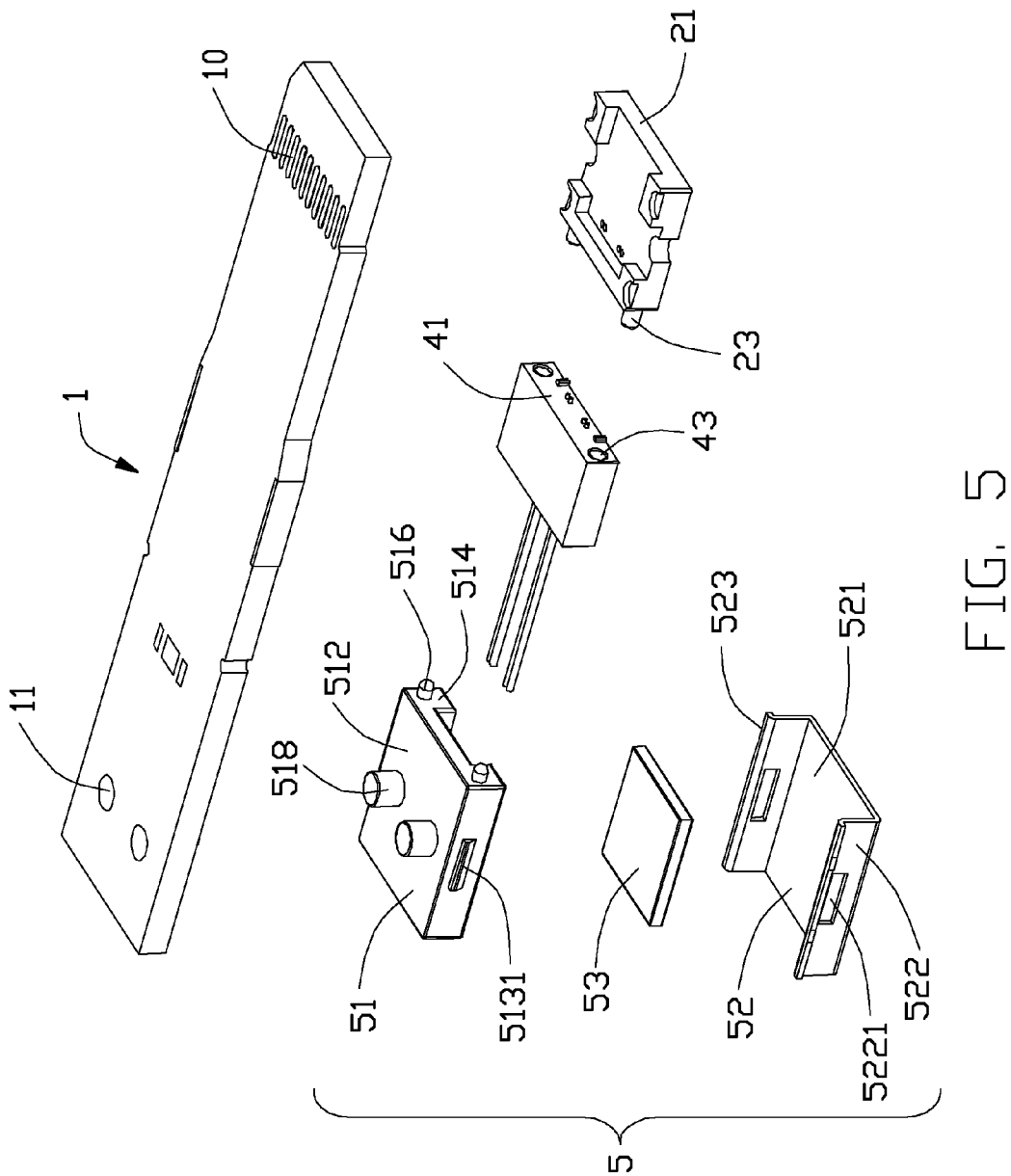
FIG. 5 is a view similar to FIG. 3 but yet another perspective.

Referring to FIGS. 4-5, the lens 2 has a front end face 21, a rear end face 22, and a pair of positioning/guiding posts 23 backwardly extending from the rear end face 22.

The fiber sleeve 4 includes a front surface 41, a rear surface 42, and a pair of positioning holes 43 receiving the positioning posts 23. When the positioning posts 23 are fixed in the positioning holes 43, the fiber sleeve 4 mates with the lens 2. The fiber sleeve 4 defines a pair of receiving holes 44 in the rear surface 42 and a recess 45 through the rear surface 42. The fiber 3 is received in the recess 45 and extends beyond the recess 45.

The board lock 5 includes a strain relief base 51 and a cover 52 enclosing the strain relief base 51. The strain relief base 51 includes a top wall 511, a bottom wall 512, a pair of side walls 513 connecting the top wall 511 and the bottom wall 512, a front wall 514 mating with the fiber sleeve 4, and a rear wall 515 corresponding to the front wall 514. The strain relief base 51 has a pair of pogo pins 516, i.e., the pin structure equipped with a compression spring, extending from the front wall 514. When the pogo pin 516 is pressed in a horizontal direction, a part of the pogo pin 516 will draw back or retract. The pogo pin 516 is fixed in the receiving hole 44 of the fiber sleeve 4. In initial state under no external force, a length of pogo pin 516 is lager than a depth of the receiving hole 44. When the pogo pin 516 is fixed in the receiving hole 44, the board lock 5 forwardly presses the rear surface 42 of the fiber sleeve 4 by an elastic restoring force of the pogo pin 516. The fiber sleeve 4 receives a forward force to positively engage the lens 2. This forward force stably keeps the fiber sleeve 4 between the lens 2 and the board lock 5.

The strain relief base 51 defines a receiving chamber 517 through the front wall 514 and the rear wall 515. The fiber 3 extends from the fiber sleeve 4 through the receiving chamber 514. A bottom surface of the receiving chamber 517 and a bottom surface of the recess 45 are at a same level for supporting the fiber 3. The board lock 5 further includes a spacer 53 received in the receiving chamber 517. The spacer 53 presses on the fiber 3 to increase the drawing force of the fiber 3. Therefore, even if the fiber 3 is pulled, the connection between the fiber 3 and the fiber sleeve 4 is not inadvertently affected. The strain relief base 51 further includes a pair of mounting posts 518 downwardly extending from the bottom wall 512. The cover 52 includes a flat portion 521, a pair of side portions 522 downwardly extending from the flat portion 521, and a soldering portion 523 outwardly extending from the side portion 522. The soldering portion 523 is welded to the base plate 1. The side portion 522 is perpendicular to the flat portion 521. Each of the side portions 522 defines an opening 5221. Each of the side walls 513 of the strain relief base 51 has a tuber 5131 fixed in the opening 5221. The tuber 5131 has a slant face at an outer side for the cover 52 to be conveniently mounted along an up-to-down direction.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the members in which the appended claims are expressed.

What is claimed is:

1. An optical module comprising:
   a horizontal base plate;
   a lens mounted on the base plate, the lens having a front end face and a rear end face corresponding to the front end face;

a fiber sleeve mated with the rear end face of the lens, the fiber sleeve having a front surface and a rear surface; and a board lock mounted at a rear of the fiber sleeve;

wherein the board lock has a strain relief base and a cover locking to the strain relief base, the strain relief base has a front wall and a pogo pin forwardly extending beyond the front wall, the fiber sleeve defines a receiving hole in the rear surface for fixing the pogo pin, and the cover is retained to the base plate.

2. The optical module as claimed in claim 1, wherein the pogo pin extends beyond the front wall of the strain relief base a length greater than a depth of the receiving hole of the fiber sleeve so as to be urged rearwardly by the fiber sleeve.

3. The optical module as claimed in claim 1, wherein the cover has a flat portion and a pair of side portions downwardly extending from the flat portion.

4. The optical module as claimed in claim 3, wherein each of the side portions defines an opening, and the strain relief base comprises a pair of side walls, each of the side walls having a tuber fixed in the opening.

5. The optical module as claimed in claim 4, wherein the tuber has a slant face for facilitating engagement of the cover.

6. The optical module as claimed in claim 5, wherein the side portion has a soldering portion extending outwardly and soldered to the base plate.

7. The optical module as claimed in claim 1, wherein the strain relief base further defines a receiving chamber for an optical fiber to extending through.

8. The optical module as claimed in claim 7, wherein the board lock further comprises a spacer received in the receiving chamber for pressing on the optical fiber.

9. The optical module as claimed in claim 1, wherein the strain relief base comprises a bottom wall and a mounting post downwardly extending from the bottom wall, and the base plate defines a mounting hole receiving the mounting post.

10. The optical module as claimed in claim 1, wherein the lens comprises a positioning post extending from the rear end face, and the fiber sleeve defines a positioning hole receiving the positioning post.

11. An optical module assembly comprising:
a printed circuit board
a lens mounted upon the printed circuit board;
a strain relief assembly mounted upon the printed circuit board behind said lens in a front-to-back direction;
a fiber holder located between the lens and the strain relief assembly in said front-to-back direction and holding therein a plurality of optical fibers extending along the front-to-back direction;
a guiding structure formed between the lens and the fiber holder to assure a relative movement therebetween along only the front-to-back direction; and
a resilient urging device located between the fiber holder and the strain relief assembly to constantly urging the fiber holder to move forwardly along said front-to-back direction.

12. The optical module assembly as claimed in claim 11, wherein the urging device is further engaged with the fiber holder to restrict movement of the fiber holder with regard to the strain relief assembly in a transverse direction perpendicular to said front-to-back direction.

13. The optical module assembly as claimed in claim 12, wherein the urging device further restricts movement of the fiber holder with regard to the strain relief assembly in a vertical direction perpendicular to both said front-to-back direction and said transverse direction.

14. The optical module assembly as claimed in claim 11, wherein said plurality of optical fibers extend through the strain relief assembly and pressed by a spacer in a vertical direction perpendicular to said front-to-back direction.

15. The optical module assembly as claimed in claim 11, wherein the strain relief assembly includes a metallic cover assembled upon an insulative base, said metallic cover soldered upon the printed circuit board while said insulative base having a mounting post extending through a corresponding through hole in the printed circuit board.

16. The optical module assembly as claimed in claim 11, wherein said urging device is a pin equipped with a spring compressible along the front-to-back direction.

17. An optical module assembly for mounting to a printed circuit board, comprising:
a lens;
a strain relief assembly located behind said lens in a front-to-back direction;
a fiber holder located between said lens and said strain relief assembly in said front-to-back direction and retaining a plurality of optical fibers therein;
a guiding device located between said lens and said fiber holder to assure movement of the fiber holder with regard to the lens along only said front-to-back direction;
a resilient urging device located between said strain relief assembly and said fiber holder to constantly urge said fiber holder to move forward along said front-to-back direction; and
said optical fibers extending through and retained by said strain relief assembly.

18. The optical module assembly as claimed in claim 17, wherein said resilient urging device restricts a relative movement between the strain relief assembly and the fiber holder in a vertical plane perpendicular to said front-to-back direction.

19. The optical module assembly as claimed in claim 17, wherein said strain relief assembly includes an insulative base assembled under a metallic cover with a spacer therebetween, said spacer pressing the optical fibers in a vertical direction perpendicular to said front-to-back direction.

20. The optical module assembly as claimed in claim 17, wherein the fiber holder forms a hole to receive said resilient urging device therein.

\* \* \* \* \*